United States Patent [19]

Twardosz

[11] E Patent Number: Re. 33,218

[45] Reissued Date of Patent: May 22, 1990

[54] WEIGHT LIFTING BAR

[76] Inventor: Brian Twardosz, 12941 Exchange, Chicago, Ill. 60633

[21] Appl. No.: 185,819

[22] Filed: Apr. 25, 1988

Related U.S. Patent Documents

Reissue of:

[64] Patent No.: 4,618,143
Issued: Oct. 21, 1986
Appl. No.: 679,869
Filed: Dec. 10, 1984

[51] Int. Cl.[5] ..... A63B 13/00

[52] U.S. Cl. ..... 272/123; 272/143; 272/DIG. 4

[58] Field of Search ..... 272/67, 68, 93, 116, 272/122, 123, 124, 143, DIG. 4; D21/197; 173/170; 74/552, 553, 554, 555, 556, 557; 16/110 R, 127; 135/72, 76

[56] References Cited

U.S. PATENT DOCUMENTS

| | | | |
|---|---|---|---|
| 1,143,702 | 6/1915 | Hart | 74/555 |
| 1,333,005 | 3/1920 | Warner | 272/143 X |
| 1,714,155 | 5/1929 | Binkley | 74/552 |
| 1,806,343 | 5/1931 | Geyer | 74/557 |
| 2,274,069 | 2/1942 | Johnson | 74/557 |
| 2,508,567 | 5/1950 | Dymeck | 272/123 |
| 2,819,081 | 1/1958 | Touraine | 272/67 |
| 3,384,370 | 5/1968 | Bailey et al. | 272/123 |
| 4,029,312 | 6/1977 | Wright | 272/123 |
| 4,461,473 | 7/1984 | Cole | 272/123 |
| 4,531,729 | 7/1985 | Wrinkle | 272/123 |
| 4,585,229 | 4/1986 | Brasher | 272/123 |

*Primary Examiner*—Robert W. Bahr

*Attorney, Agent, or Firm*—Hill, Van Santen, Steadman & Simpson

[57] ABSTRACT

A weight lifting bar has hand grip members selectively rotatable relative to the longitudinal axis of the bar so that an exercisor can perform lifting exercises benefiting different muscle groups using a single bar and a single set of weights. A pair of concentric rotatable rings are used, the outer ring being secured to the bar and the inner ring carrying the hand grip member. The rings are securable against rotation after the desired angular relationship between the hand grip member and the bar is selected.

11 Claims, 1 Drawing Sheet

WEIGHT LIFTING BAR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to exercise equipment and more particularly to an improved bar for use in lifting weights.

2. Description of the Prior Art

The sport of weight lifting using barbells to lift weights is well known. In performing such lifting exercises, different bars may be used depending on which particular set of muscles are being exercised during the lifting routine. For example, straight bars are used for general lifting, equal sets of weights being removably secured near the outer ends of the bar, outboard of a gripping area. Curling bars are known which have kink or bend in the bar in each of the two hand grip areas so that the exercisor's hands will be turned slightly relative to the axis of the bar during lifting. This increases the benefical result to the biceps. A tricep bar is known which has an even more pronounced bend in each hand grip portion so that exercisor's hand are positioned at an even greater angle relative to the axis of the bar. As suggested by the name, this bar increases the benefits to the triceps during lifting exercise.

With the use of these prior and known bars, the exercisor would either have to have multiple sets of weights, each set being held on one of the respective bars for performing the various exercises serially, or else the exercisor would have to remove each set of weights from a particular bar and replace those selected weights on another one of the bars to perform the next lifting exercise. In any event, the exercisor would have to have at least three separate bars for performing the three exercises described above. For each different angle of handle grip, the exercisor would require a separate bar and, perhaps, its associated weights.

SUMMARY OF THE INVENTION

The present invention provides a weight lifting bar in which the grip area is selectively rotatable relative to the axis of the bar such that an exercisor may select one of a plurality of different angular relationships between the handle portion and the bar to exercise various sets of muscles without requiring separate bars or requiring multiple sets of weights.

The angle of the grip portion can be changed rapidly and easily without requiring the removal of the weights and can be securely held in the selected angular position for lifting.

Each hand grip area has a pair of concentric rings which are relatively rotatable, an outer ring being permanently affixed to the bar and an inner ring have a cylindrical grip permanently affixed to it. Retaining means are provided to hold the rings in a selected rotational position during the lifting exercise.

DESCRIPTION OF THE PREFERRED EMBODIMENTS

Figure 1:
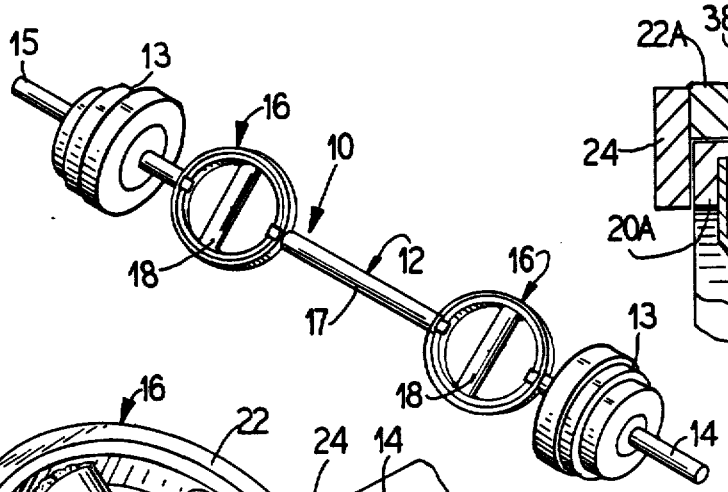
FIG. 1 is a perspective view of a weight bar incorporating the principles of the present invention.

In FIG. 1 there is shown a weight lifting apparatus generally at 10 comprised of a weight lifting bar 12 which two sets of selectively removable weights 13, 13 which are secured near opposite ends 14, 15 of the bar 12. Positioned inboard of the weights 13, 13 are a pair of grip assemblies 16, 16 spaced out board of a central area 17 of the bar 12 and are shown in greater detail in FIGS. 2–4.

Figure 2:
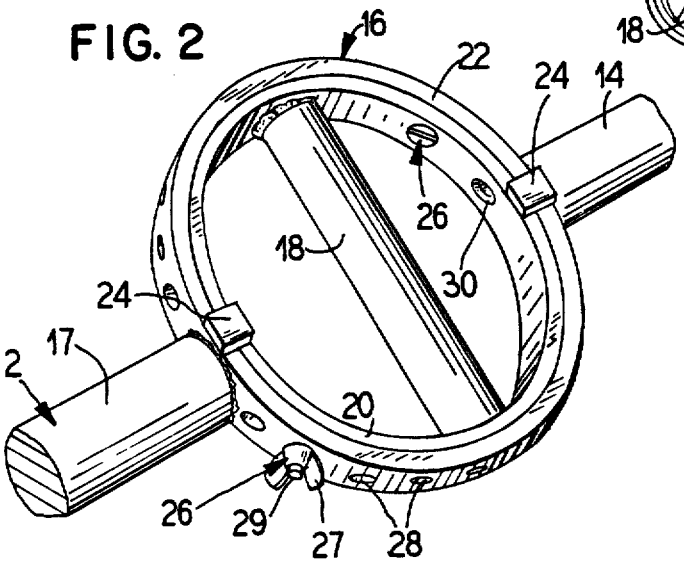
FIG. 2 is an enlarged partial view of the hand grip area of the weight bar shown in FIG. 1.
Figure 4:
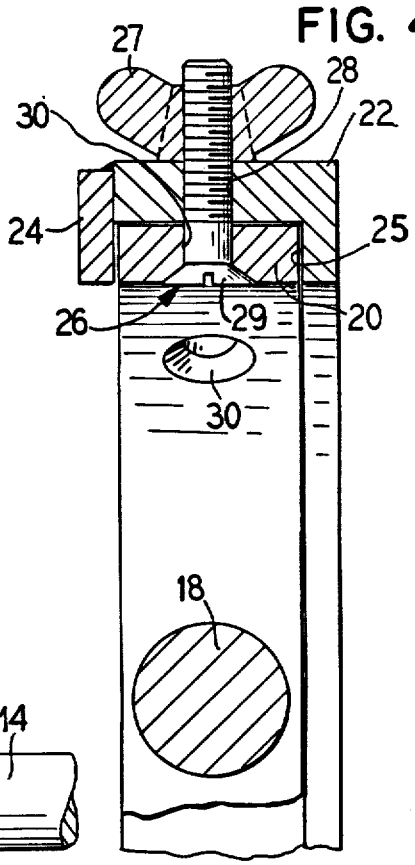
FIG. 4 is a partial cross-sectional view of the retaining means for the handle portion.
Figure 3:
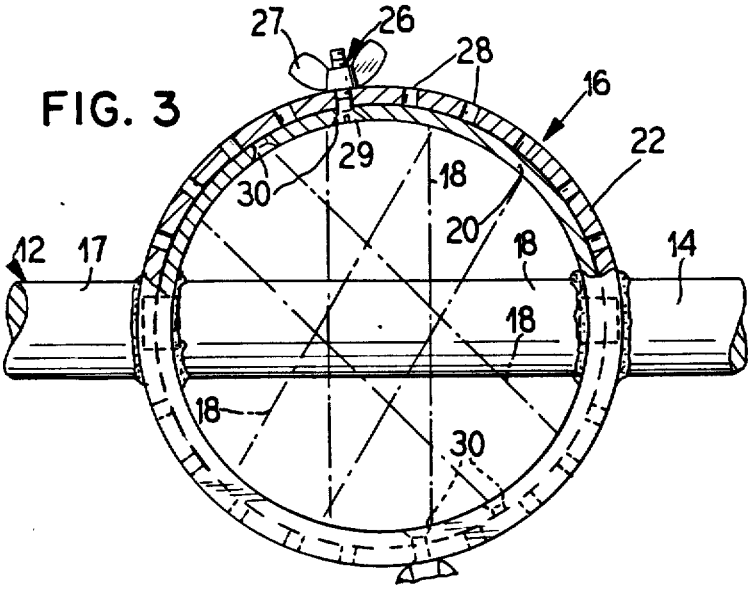
FIG. 3 is a partial sectional view of the hand grip portion.

As shown in FIGS. 2–4 the grip assembly 16 is comprised of a grip cylinder 18 secured to an inner ring 20. The inner ring 20 is rotatably carried in an outer ring 22. The outer ring 22 is permanently affixed to the bar 12 such as by welding one peripheral side of the ring 22 to the end portion 14 and an opposite peripheral side of the ring 22 to the central portion 17.

The inner ring 20 is just slightly smaller than the outer ring so that the rings freely rotate relative to one another, but without a large degree of relative lateral movement permissable between the rings. The inner ring 20 is axially captured in the outer ring 22 by ears 24, 24 which form a part of the outer ring 22 and overlie a portion of the inner ring 20. The ears 24, 24 may be located on only one side of the outer ring 22 with the inner ring seated on an annular flange 25 (FIG. 4) on the outer ring 22 or the ears 24, 24 may be located on both sides of the outer ring 22, each ear 24 located at 90° from an ear on the opposite side and 180° from an ear on the same side. Thus, the inner ring 20 is free to rotate relative to the outer ring 22, but is held in a fixed axial and lateral position relative to the outer ring 22. Since the grip cylinder 18 is fixed to the inner ring 20, the grip cylinder 18 is rotatable relative to the bar 12.

The rotational position of the inner ring 20 relative to the outer ring 22 can be selectively fixed by means of a pair of retaining means 26, 26 shown in FIGS. 2–4 as comprising a wing 27 nut captured on a screw 29. A plurality of spaced apertures 28 are provided around the circumference of the outer ring 22 and two pairs of opposed apertures 30 are provided through the inner ring 20 for receiving the retaining means 26.

The apertures 28 formed in the outer ring 22 are preferably spaced at even intervals of, for example, 15°. The adjacent apertures 30 in the inner ring are preferably spaced at an interval different than the spacing of the outer ring, for example, 22.5°. By such an arrangement, the grip cylinder 18 may be selectively retained at a desired angular position, with the selectable positions being every 7.5°. Also, with at least two apertures 30 in the inner ring any interference due to the bar 12 is avoided.

Thus, to change the angular position of the grip cylinder 18 relative to the bar 12, the two wing nuts would be removed from the screws, the screws removed from the apertures 28, 30 and the grip cylinder 18 would then be free to rotate relative to the bar 12 several angular positions are shown in phantom in FIG. 3. Upon arrival at a desired angular position, the screws would be reinserted through two opposite apertures 30 and through the aligned apertures 28 to retain the rings 20, 22 in a fixed relationship. Thus, an exercisor could readily perform general lifting exercises, curling exercises and tricep exercises serially without having to remove the weights 14, 14 from the bar 12. The only removal or addition of the weights would be dependent on the amount of weight desired to be lifted in any particular exercise. In most cases, the majority of the weights would remain in place.

Figure 5:
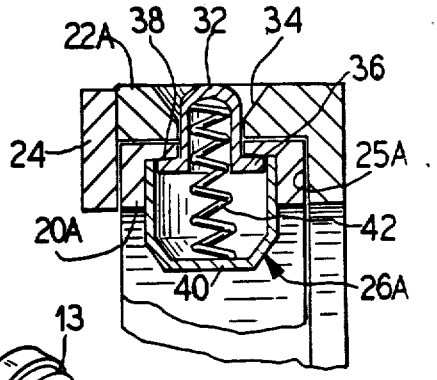
FIG. 5 is a partial cross-sectional view of an alternate embodiment of the retaining means.

In FIG. 5 there is shown an alternate embodiment of the retaining means 26A which comprises a spring loaded button manually displaceable for selectively retaining the rings 20A, 22A in the desired rotational relationship. Specifically, the retaining means 26A comprises a button member 32 which protrudes upwardly through a bevelled opening 34 in the outer ring 22A. The opening 34 corresponds to the openings 28 identified in the first embodiment above. The button 32 has an annular shoulder 36 at a bottom end for seating against a step portion 38 of the inner ring 20A. Thus, the button 32 is prevented from moving outwardly beyond the engagement point of the shoulder 36 with the step 38.

A button housing 40 is frictionally seated in the inner ring 20A and is hollow to receive the annular shoulder 36 of the button 32 as the button 32 is depressed into the housing 40. A coil spring 42 is positioned on the interior of the housing 40 and button 32 to continuously bias the button 32 outwardly.

When the exercisor wishes to select a different rotational position of the grip cylinder 18 relative to the bar 12, he would merely depress the buttons 32, of which would there would preferably be two opposed, so that the button 32 would clear the inside of the outer ring 22A. Then, the inner ring 20A would be free to rotate within the outer ring 22A. When the desired position is reached the button 32 would align with one of the apertures 34 in the outer ring 22A and would securely hold the inner ring 20A in a fixed rotational position relative to the outer ring. Although other types of retaining devices can be used to selectively hold the two rings in a fixed relative rotational position, a retaining means of the type shown in FIG. 5 is advantageous in that it avoids the necessity of removal and replacement of any parts.

It is thus seen from the foregoing description that the present invention comprises a weight lifting bar having hand grip portions selectively rotatable relative to the longitudinal axis of the bar and which can be selectively rotated without requiring the removal of the weights on the bar, such that a plurality of different exercises may be performed using a single bar and a single set of weights. Various retaining means can be used to secure the concentric rings in the desired rotational positions.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. In a bar with a longitudinal axis having opposed end portions receiving selectively removable weights, a central portion and two spaced hand grip portions each inboard of said end portions and outboard of said central portion, said hand grip portion comprising:

an outer ring member secured on one peripheral side to said outer portion and on opposite peripheral side to said central portion;

said outer ring member having a plurality of spaced apertures therethrough around its periphery;

an inner ring member concentrically captured in said outer ring member and being free to rotate relative to said outer ring member;

said inner ring member having at least one aperture therethrough selectively alignable with said apertures in said outer ring;

a retaining means extendable through said aperture in said inner ring and said aligned aperture in said outer ring to selectively secure said two rings against relative rotation;

a cylindrical hand grip member extending across said inner ring and being secured thereto;

whereby, said hand grip member can be selectively rotated relative to said bar and retained in said selected position to permit various exercises to be performed without removal of said weights from said bar.

2. A device according to claim 1, said retaining means comprising at least one screw and associated nut for each set of rings.

3. A device according to claim 1, said retaining means comprising at least one spring loaded button held in said aperture in said inner ring for engaging with one of said apertures in said outer ring.

4. A device according to claim 1, said apertures in said outer ring being evenly spaced around the periphery of said outer ring and at least two spaced apertures in said inner ring, said inner ring apertures having a different spacing than said outer ring apertures whereby the number of selectable positions for said hand grip member is increased.

*5. A device use to hold weights during human exercise comprising:*

*a bar with a longitudinal axis having opposed end portions receiving selectively removable weights, a central portion and two spaced hand grip portions each inboard of said end portions;*

*said hand grip portions each comprising:*

*an outer ring member non-removably secured with respect to one of said end portions;*

*a cylindrical hand grip member extending across said ring member; and*

*a retaining means engageable between said grip member and said ring member to selectively secure said grip member against relative rotation;*

*whereby, said hand grip member can be selectively rotated relative to said bar and retained in said selected position to permit various exercises to be performed without removal of said weights from said bar.*

*6. In a bar with a longitudinal axis having opposed end portions, receiving selectively removable weights, a central portion and two spaced hand grip portions each inboard of said end portions, said hand grip portion comprising:*

*a fixed ring member non-removably secured with respect to said end portion and to said central portion;*

*a cylindrical hand grip member captured on said ring member and being free to rotate relative to said ring member; and*

*a retaining means engageable between said hand grip member and said ring member to selectively secure*

*said grip member and ring member against relative rotation;*

*whereby, said hand grip member can be selectively rotated relative to said bar and retained in said selected position to permit various exercises to be performed without removal of said weights from said bar.*

*7. A device according to claim 6, said retaining means comprising an inner ring member concentrically captured in said fixed ring member and being free to rotate relative to said fixed ring member, said inner ring member and fixed ring members having apertures therethrough which are selectively alignable and at least one screw and associated nut for each set of rings to secure said two rings in a selected position by extending through said aligned apertures.*

*8. A device according to claim 7, said apertures in said fixed ring being evenly spaced around the periphery of said fixed ring and at least two spaced apertures in said inner ring, said inner ring apertures having a different spacing than said fixed ring apertures whereby the number of selectable positions for said hand grip member is increased.*

*9. A device used to hold weights during human exercise comprising:*

*a bar with a longitudinal axis having opposed end portions receiving selectively removable weights, a central portion, and two spaced hand grip portions inboard of said end portions and non-removably secured relative to each other and said end portions;*

*said hand grip portions each comprising a cylindrical hand grip member selectively rotatable perpendicular to said bar axis;*

*a retaining means associated with said hand grip portions to hold said hand grip portions in a selected rotational position during the exercise.*

*10. A device used to hold weights during human exercise comprising:*

*a bar with a longitudinal axis having opposed end portions receiving selectively removable weights and two spaced hand grip portions each inboard of said end portions and non-removably secured relative to each other and said end portions;*

*said hand grip portions each comprising:*

*an outer ring member secured against rotation to said bar;*

*a cylindrical hand grip member extending across a diameter of said ring member; and*

*a retaining means engageable between said hand grip member and said ring member to selectively secure said hand grip member against rotation relative to said bar member;*

*wherein said hand grip member can be selectively rotated relative to said bar and retain in said selected position to permit various exercises to be performed without removal of said weights from said bar.*

*11. A device used to hold weights during human exercise comprising:*

*a bar with a longitudinal axis having opposed end portions receiving selectively removable weights, a central portion, and two spaced hand grip portions each inboard of said end portions;*

*said hand grip portions each comprising: an outer ring member non-removably secured, at a plurality of points along its periphery with respect to one of said end portions;*

*a cylindrical handgrip member extending along a diameter of said outer ring member;*

*wherein the diameter of said outer ring member permits the unobstructed grasping of said handgrip member by a user of said device;*

*retaining means engageable between said hand grip member and said outer ring member to selectively secure said handgrip member, in any one of a plurality of positions, against rotation relative to said outer ring member; and*

*whereby, said handgrip member can be selectively rotated relative to said bar and retained in said selected position to permit various exercises to be performed without removal of said weights from said bar.*

* * * * *